United States Patent
Hao et al.

(10) Patent No.: US 10,992,168 B2
(45) Date of Patent: Apr. 27, 2021

(54) APPARATUS OF POWER DISTRIBUTION AND METHOD OF POWER DISTRIBUTION

(71) Applicant: Delta Electronics (Shanghai) CO., LTD, Shanghai (CN)

(72) Inventors: Feiqin Hao, Shanghai (CN); Hongyang Wu, Shanghai (CN); Chao Yan, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 36 days.

(21) Appl. No.: 16/243,371

(22) Filed: Jan. 9, 2019

(65) Prior Publication Data

US 2019/0229551 A1 Jul. 25, 2019

(30) Foreign Application Priority Data

Jan. 23, 2018 (CN) .......................... 201810062799.5

(51) Int. Cl.
*H02J 3/00* (2006.01)
*H02J 9/06* (2006.01)

(52) U.S. Cl.
CPC . *H02J 9/06* (2013.01); *H02J 3/00* (2013.01)

(58) Field of Classification Search
CPC .. H02J 9/06; H02J 3/00; H02J 2310/12; H02J 9/062; H02J 3/383; H02J 3/382; H02J 3/28; H02J 3/381
See application file for complete search history.

(56) References Cited

U.S. PATENT DOCUMENTS

| | | | |
|---|---|---|---|
| 6,339,538 B1 | 1/2002 | Handleman | |
| 7,042,376 B1 * | 5/2006 | Regier | H03M 1/1225 341/141 |
| 8,148,851 B2 * | 4/2012 | Hahnlen | H05B 47/10 307/113 |
| 8,886,363 B2 | 11/2014 | Matthews et al. | |
| (Continued) | | | |

FOREIGN PATENT DOCUMENTS

| | | |
|---|---|---|
| CN | 102214994 A | 10/2011 |
| CN | 202405863 U | 8/2012 |
| (Continued) | | |

OTHER PUBLICATIONS

The JP1OA issued Feb. 18, 2020 by the JPO.
The CN1OA issued May 28, 2020 by the CNIPA.

*Primary Examiner* — Pinping Sun
(74) *Attorney, Agent, or Firm* — Qinghong Xu

(57) ABSTRACT

The power distribution device includes a power regulating device and a first auxiliary power distribution component. The power regulating device has a first output end connected to an AC power grid and a second output end. The first auxiliary power distribution component has a first movable end electrically connected to a load, a first fixed end electrically connected to the AC power grid and a second fixed end electrically connected to the second output end, and a ground line of the second fixed end is grounded. When the AC power grid is normal, the first movable end is connected to the first fixed end, such that the AC power grid supplies power to the load. And when the AC power grid is abnormal, the first movable end is connected to the second fixed end, such that the power regulating device supplies power to the load through the second output end.

11 Claims, 8 Drawing Sheets

(56) References Cited

U.S. PATENT DOCUMENTS

| | | | |
|---|---|---|---|
| 9,711,967 B1* | 7/2017 | Czarnecki | H02J 5/00 |
| 10,511,173 B2* | 12/2019 | Nakayama | H02M 3/04 |
| 10,536,030 B2* | 1/2020 | Xu | H02J 3/14 |
| 2011/0121662 A1* | 5/2011 | Huang | H02H 3/00 |
| | | | 307/125 |
| 2012/0267957 A1* | 10/2012 | Czarnecki | H02J 3/02 |
| | | | 307/64 |
| 2012/0281444 A1* | 11/2012 | Dent | H02J 7/0068 |
| | | | 363/56.01 |
| 2014/0117764 A1* | 5/2014 | Navarro | H02J 9/062 |
| | | | 307/64 |
| 2014/0140112 A1* | 5/2014 | Zhou | H02M 1/126 |
| | | | 363/40 |
| 2015/0155712 A1* | 6/2015 | Mondal | H02J 3/1857 |
| | | | 307/23 |
| 2015/0244174 A1* | 8/2015 | Li | H02J 5/00 |
| | | | 307/45 |
| 2015/0280607 A1* | 10/2015 | Wachenfeld | H02M 7/42 |
| | | | 363/95 |
| 2016/0322860 A1* | 11/2016 | Wu | H02J 9/06 |
| 2016/0322916 A1* | 11/2016 | Hao | H02M 7/483 |
| 2017/0077747 A1* | 3/2017 | Paatero | H02J 9/061 |
| 2017/0133850 A1* | 5/2017 | Maji | H02J 3/28 |
| 2017/0236648 A1* | 8/2017 | Lazarev | C07D 471/06 |
| | | | 320/166 |
| 2018/0309299 A1* | 10/2018 | Moriyama | H01H 3/001 |

FOREIGN PATENT DOCUMENTS

| | | | |
|---|---|---|---|
| CN | 103457514 A | | 12/2013 |
| CN | 104505849 A | | 4/2015 |
| CN | 105379049 A | | 3/2016 |
| CN | 105720602 A | | 6/2016 |
| CN | 106160176 A | | 11/2016 |
| JP | 2014161173 A | | 9/2014 |
| JP | 2017184582 A | * | 10/2017 |
| JP | 2017184582 A | | 10/2017 |
| WO | 2017073079 A1 | | 5/2017 |

\* cited by examiner

APPARATUS OF POWER DISTRIBUTION AND METHOD OF POWER DISTRIBUTION

CROSS-REFERENCE TO RELATED APPLICATIONS

This application is based on and claims priority to Chinese patent application No. 201810062799.5 filed on Jan. 23, 2018, the entire content of which is hereby incorporated by reference for all purposes.

TECHNICAL FIELD

The present disclosure relates to the field of power electronics, and particularly to an apparatus of power distribution and a method of power distribution.

BACKGROUND

With the increasing severity of environmental problems, the application of new energy is becoming more and more widespread. How to connect new energy power generation into the power grid has become a focus of attention.

For connecting to the power grid, the new energy power generation not only needs to meet the requirement when it is in grid-connected operation, but also needs to meet the requirement of being able to safely supply power to the load when it is in off-grid operation. However, the existing power distribution equipment can hard meet the requirement of the grid-connected operation and off-grid operation of new energy power generation without changing the original power distribution structure owned by users.

It should be noted that, the above information disclosed in the background section is only for enhancing the understanding of the background of the present disclosure, and thus may include information that does not constitute prior art known to those of ordinary skill in the art.

SUMMARY

The object of the present disclosure is to provide an apparatus of power distribution and a method of power distribution, so as to, at least to some extent, overcome one or more problems due to limitations and disadvantages of the related art.

According to a first aspect of the present disclosure, an apparatus of power distribution is provided, including:

a power regulating device, having a first output end and a second output end, wherein the first output end is electrically connected to an AC power grid; and a first auxiliary power distribution component, having a first movable end, a first fixed end and a second fixed end, wherein the first movable end is electrically connected to a load, the first fixed end is electrically connected to the AC power grid, the second fixed end is electrically connected to the second output end, and a ground line of the second fixed end is grounded, wherein, when the AC power grid is normal, the first movable end is connected to the first fixed end, such that the AC power grid supplies power to the load; and when the AC power grid is abnormal, the first movable end is connected to the second fixed end, such that the power regulating device supplies power to the load through the second output end.

In some embodiments of the disclosure, a neutral line of the load is electrically connected to a neutral line of the second output end, and when the first movable end is connected to the second fixed end, the neutral line of the load and the neutral line of the second output end are electrically connected to the ground line of the second fixed end, and grounded through the ground line of the second fixed end.

In some embodiments of the disclosure, the power regulating device has a first input, the first input is electrically connected to a power generation device, and the power regulating device converts electrical energy of the power generation device.

In some embodiments of the disclosure, the power regulating device further has a second input end, the second input end is electrically connected to an energy storage device, and the power regulating device converts electrical energy charging the energy storage device or electrical energy discharged from the energy storage device.

In some embodiments of the disclosure, the first input end is a DC input end, and when the AC power grid is normal, the power regulating device converts the electrical energy of the power generation device into a first alternating current and transmits it to the AC power grid through the first output, such that the power generation device operates in a grid-connected power generation mode; and when the AC power grid is abnormal, the power regulating device converts the electrical energy of the power generation device into a second alternating current and supplies power to the load through the second output end, such that the power generation device operates in an off-grid power generation mode.

In some embodiments of the disclosure, when the AC power grid is normal, the power regulating device converts the electrical energy of the energy storage device into the first alternating current and transmits it to the AC power grid through the first output end; and when the AC power grid is abnormal, the power regulating device converts the electrical energy of the energy storage device into the second alternating current and supplies power to the load through the second output end.

In some embodiments of the disclosure, the apparatus of power distribution further includes: a second auxiliary power distribution component, wherein the second auxiliary power distribution component has a second movable end, a third fixed end and a fourth fixed end, the second movable end is electrically connected to the power generation device, the third fixed end is electrically connected to the first input end, the fourth fixed end is electrically connected to the AC power grid, and a ground line of the third fixed end is grounded.

In some embodiments of the disclosure, the first input end is an AC input end, and when the AC power grid is normal, the second movable end is connected to the fourth fixed end, and the power generation device outputs the electrical energy to the AC power grid through the second auxiliary power distribution component, such that the power generation device operates in a grid-connected power generation mode; and when the AC power grid is abnormal, the second movable end is connected to the third fixed end, the power generation device outputs the electrical energy to the first input end through the second auxiliary power distribution component, such that the power generation device operates in an off-grid power generation mode.

In some embodiments of the disclosure, when the AC power grid is abnormal, a neutral line of an output end of the power generation device is connected to the ground line of the third fixed end, so as to be grounded through the third fixed end.

In some embodiments of the disclosure, the apparatus of power distribution is applied to household power distribution, and the first auxiliary power distribution component is disposed to precede a main switch of a household load.

According to a second aspect of the present disclosure, a method of power distribution is provided, applied on the above apparatus of power distribution, including:

when the AC power grid is normal, the first movable end of the first auxiliary power distribution component is connected to the first fixed end, so that the AC power grid supplies power to the load; and when the AC power grid is abnormal, the first movable end of the first auxiliary power distribution component is connected to the second fixed end, so that the power regulating device supplies power to the load through the second output end.

According to a third aspect of the present disclosure, a method of power distribution is provided, applied on the above apparatus of power distribution, including:

when the AC power grid is normal, the first movable end of the first auxiliary power distribution component is connected to the first fixed end, such that the AC power grid supplies power to the load, and the second movable end of the second auxiliary power distribution component is connected to the fourth fixed end, such that the power generation device outputs the electrical energy to the AC power grid; and when the AC power grid is abnormal, the first movable end of the first auxiliary power distribution component is connected to the second fixed end, so that the power regulating device supplies power to the load through the second output end, and the second movable end of the second auxiliary power distribution component is connected to the third fixed end, such that the power generation device outputs the electrical energy to the power regulating device.

The apparatus of power distribution of the disclosure not only can realize safe power supply, but also can realize a plurality of power distribution manners without changing the original power distribution lines. For example, the power distribution manner, which can be realized when the power grid is normal, includes: the power grid supplies power to the load, both the power grid and the new energy simultaneously supply power to the load, or the power grid, the new energy and the energy storage device jointly supply power to the load. And the power distribution manner, which can be realized when the power grid is abnormal, includes: new energy supplies power to the load, and new energy and energy storage device collectively supply power to the load. Switching can be performed flexibly among the above various power distribution manners only by changing the connection manner of the ends of the auxiliary power distribution component, which is very convenient.

Through the apparatuses of power distribution and methods of power distribution according to exemplary embodiments of the disclosure, on the one hand, when the AC power grid is abnormal, the first movable end of the first auxiliary power distribution component is connected with the second fixed end, and the ground line of the second fixed end is grounded, so that in off-grid operation, the neutral line of the load side is grounded, so as to safely supply power to the load. On the other hand, the apparatus of power distribution in exemplary embodiments of the disclosure can meet the requirement of the grid-connected operation and off-grid operation without changing the original power distribution structure owned by users, thereby saving manpower and material costs.

It should be appreciated that the above general description and the following detailed description are merely exemplary and explanatory, which are not restrictions to the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It is apparent that, the drawings in the following description are only some of the embodiments of the present disclosure, and from these drawings, other drawings may be obtained by those of ordinary skill in the art without paying out inventive labors. In the drawing.

DETAILED DESCRIPTION

Figure 1:
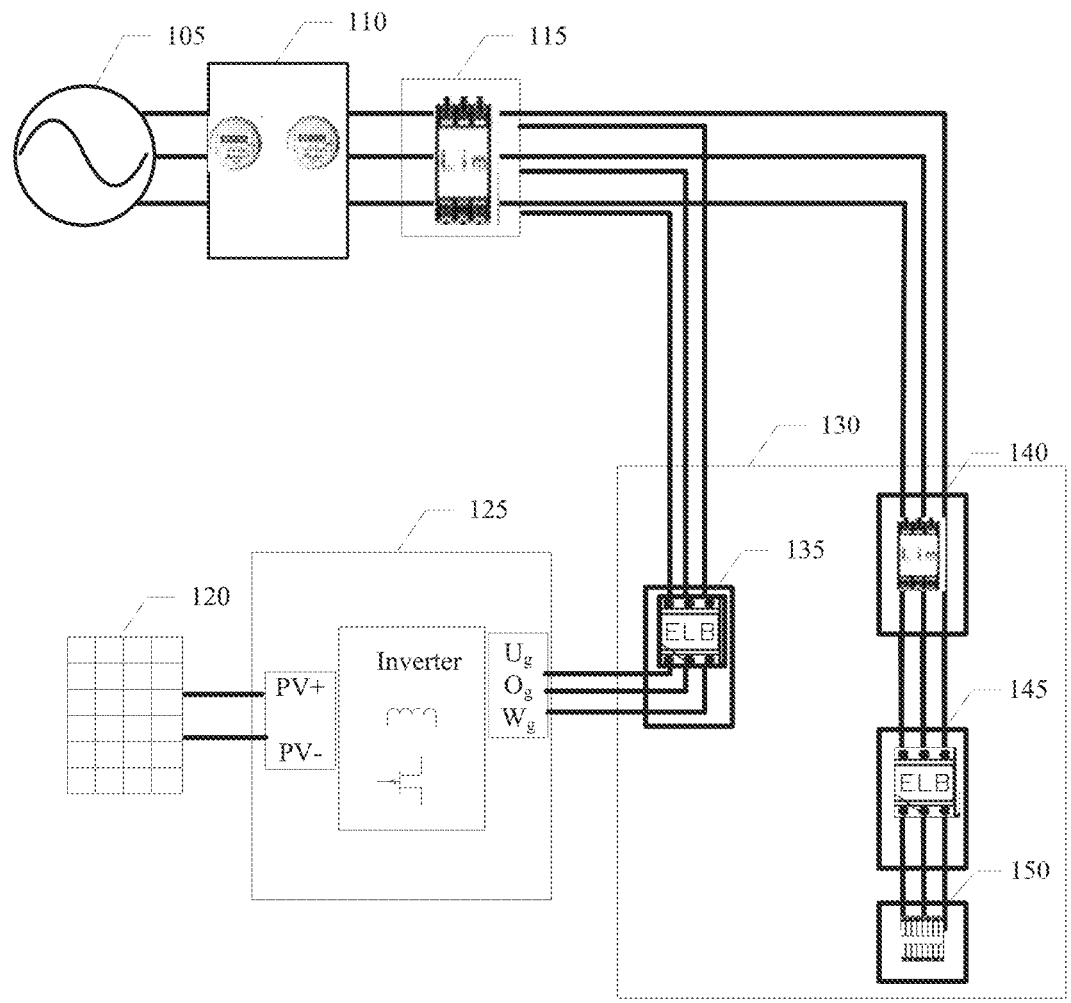
FIG. 1 is a schematic diagram showing a power distribution mode of new energy grid-connected in a technical solution in prior art.

Exemplary embodiments will now be described more fully with reference to the accompanying drawings. However, the exemplary embodiments can be embodied in a variety of forms and should not be construed as being limited to the embodiments set forth herein. Rather, these embodiments are provided so that the present disclosure will be thorough and complete and the concepts of the exemplary embodiments are fully conveyed to those skilled in the art. Furthermore, the described features, structures or characteristics may be combined in any suitable manner in one or more embodiments. In the following description, numerous specific details are set forth to provide a thorough illustration to the embodiments of the disclosure. However, one skilled in the art will appreciate that the technical solution of the disclosure may be practiced without one or more of the specific details, or may be practiced by employing other structures, components, steps, methods, etc. In other instances, well-known structures, components or operations are not shown or described in detail to avoid obscuring the respective aspects of the disclosure.

In addition, the drawings are merely schematic representations of the present disclosure and are not necessarily to be drawn in proportion. The same reference numerals in the drawings denote the same or similar parts, and the repeated description thereof will be omitted. Some block diagrams shown in the drawings are merely functional entities and do not necessarily have to correspond to physically or logically separate entities. That is, these functional entities may be implemented in software, or these functional entities or a part of them may be implemented in one or more hardware modules or integrated circuits hardened from software, or these functional entities may be implemented in different networks and/or processor devices and/or microcontroller devices.

Furthermore, the item "connect" used in this disclosure may include being directly or indirectly physically or electrically contacted/coupled to each other by two or more elements.

FIG. 1 is a schematic diagram showing a power distribution mode of new energy grid-connected in a technical solution in prior art. Referring to FIG. 1, the system of power distribution may include: an electric meter 110, a capacity-limiting circuit breaker 115, a home power distribution side 130 and an energy conversion module 125. The home power distribution side 130 may include: a leakage protection circuit breaker 135, a capacity-limiting circuit breaker 140, a leakage protection circuit breaker 145 and a load 150.

The electric meter 110 is electrically connected to the power grid 105 for measuring the electricity amount output to or input from the power grid. The capacity-limiting circuit breaker 115 is electrically connected to the leakage protection circuit breaker 135 and the capacity-limiting circuit breaker 140 in the home distribution side 130. The energy conversion module 125 includes a first input end and a first output end, the first input end is connected to the photovoltaic power generation device 120, and the first output end is electrically connected to the leakage protection circuit breaker 135 for converting the electrical energy output by the power generation device 120.

However, the system of power distribution shown in FIG. 1 can only implement one operation mode in which the photovoltaic power generation device 120 is connected to the grid to sell electricity, but the photovoltaic power generation device 120 cannot supply power to the load in the event of a power grid failure.

Figure 2:
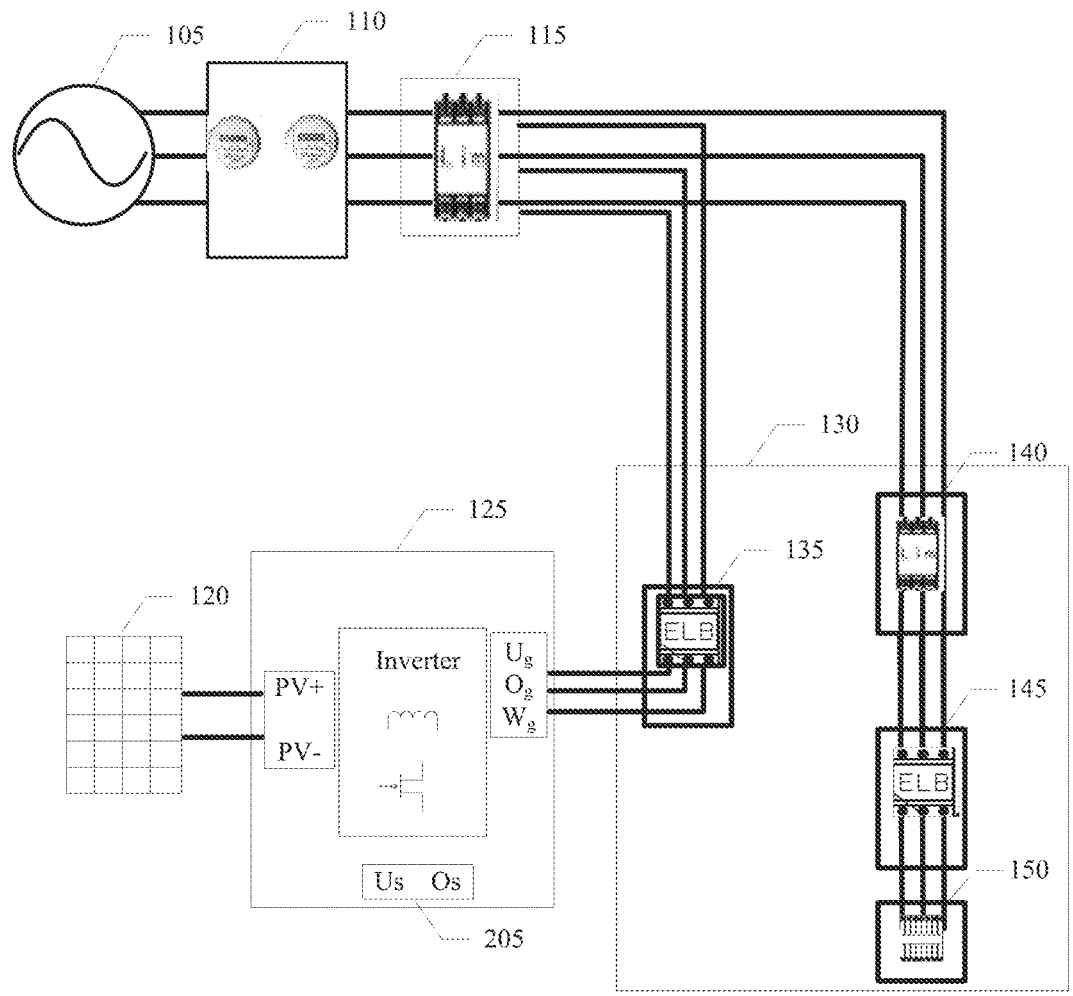
FIG. 2 is a schematic diagram showing a power distribution mode of new energy grid-connected in another technical solution in prior art.

FIG. 2 is a schematic diagram showing a power distribution mode of new energy grid-connected in another technical solution in prior art. The system of power distribution in FIG. 2 differs from the system of power distribution in FIG. 1 in that: the energy conversion module 125 further includes an off-grid power supply outlet 205 for supplying power to the load when the power grid 105 fails. The connection of the system of power distribution in FIG. 2 is the same as that of the system of power distribution in FIG. 1 when they are in grid-connected operation, so it will not be repeated here.

However, in the system of power distribution shown in FIG. 2, when the power grid 105 fails, the household load needs to obtain electricity via the off-grid power supply outlet 205 outside the house, which is very inconvenient and has the same problem that the power supply is unstable due to weather and the like.

Figure 3:
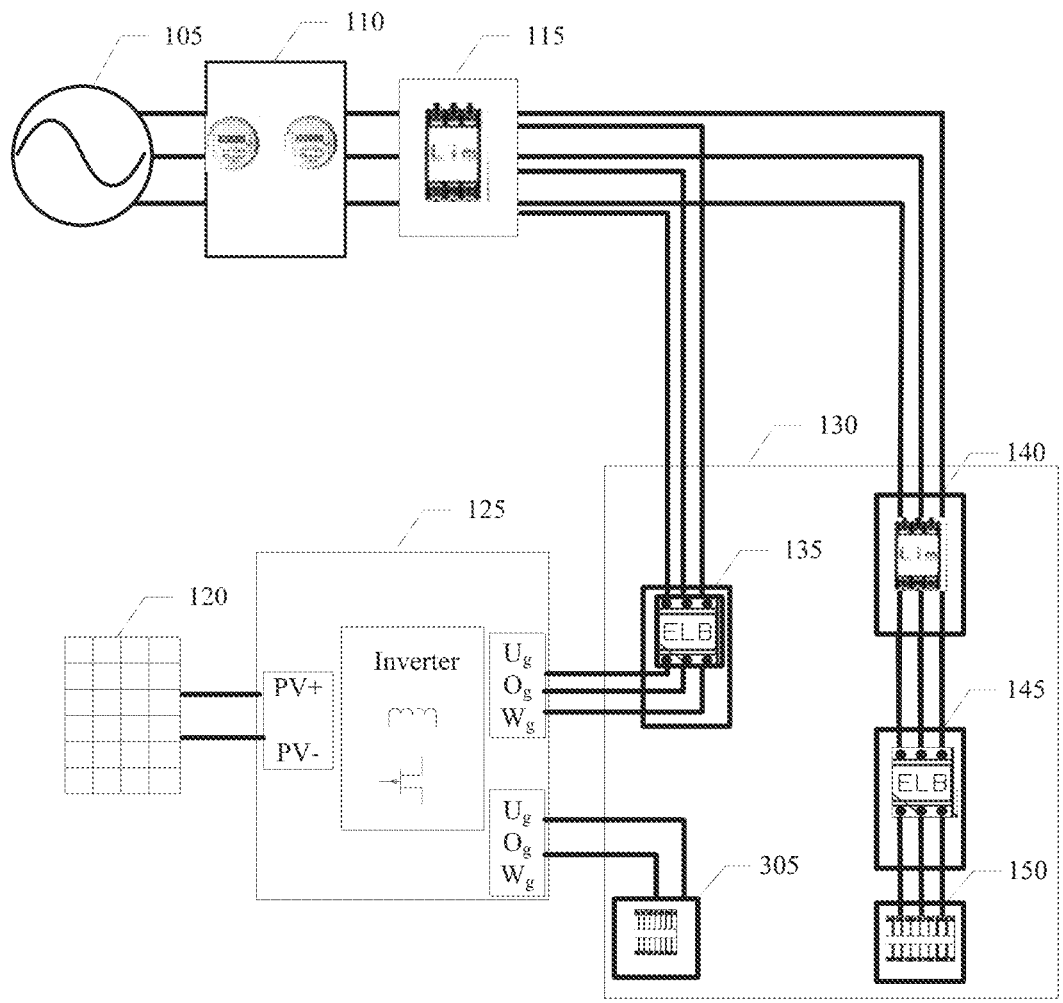
FIG. 3 is a schematic diagram showing a power distribution mode of new energy grid-connected in further another technical solution in prior art.

FIG. 3 is a schematic diagram showing a power distribution mode of new energy grid-connected in further another technical solution in prior art. The system of power distribution of FIG. 3 differs from the system of power distribution of FIG. 1 in that: the energy conversion module 125 further includes a second output, the home power distribution side 130 further includes a preferential load 305, and the preferential load 305 is electrically connected to the second output of the energy conversion module 125.

Although the system of power distribution shown in FIG. 3 still has the problem of unstable power supply, the critical load can easily obtain electricity in the event of a power grid failure. However, the system of power distribution in FIG. 3 is suitable for newly-built houses. For existing houses that have already completed power distribution renovation, it is necessary to retrofit the existing power distribution manner, which is very expensive.

Figure 4:
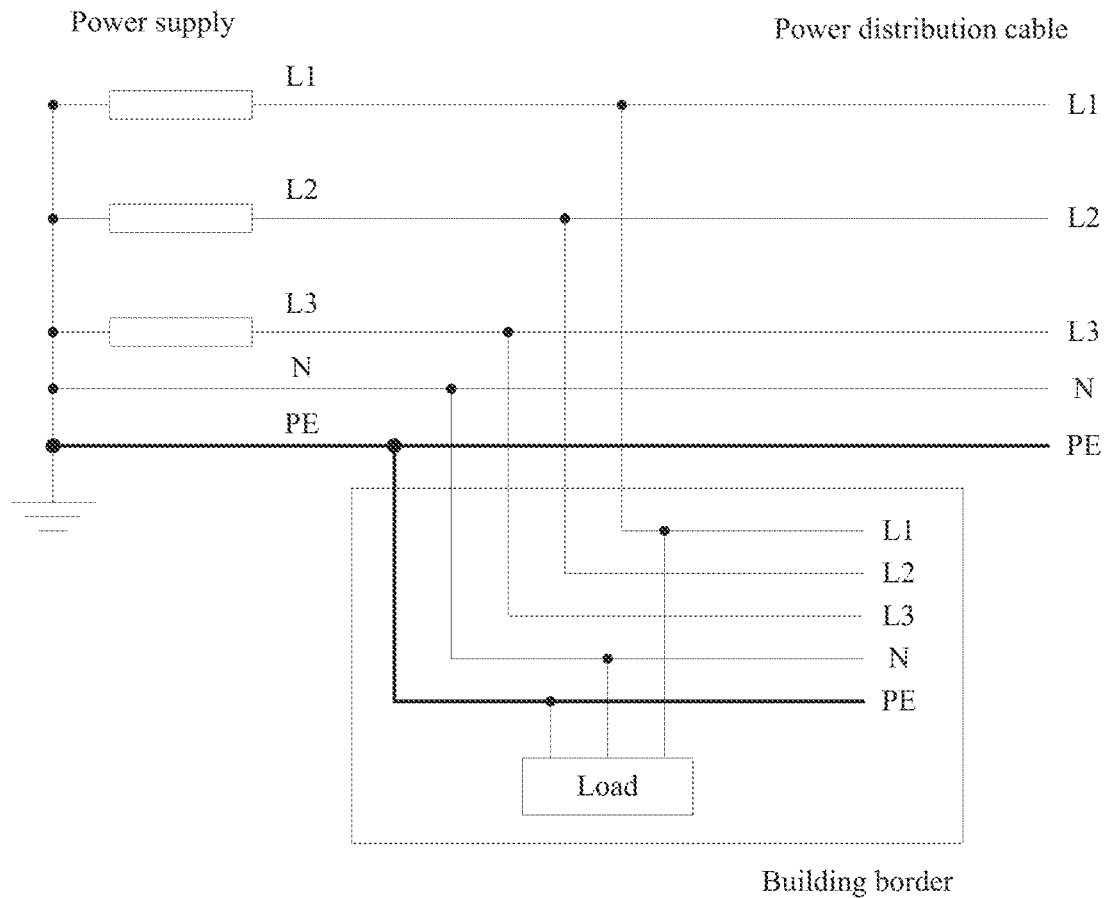
FIG. 4 is a schematic diagram showing a TN-S (Terra Neutral-Separate) power supply system in a technical solution in prior art.
Figure 5:
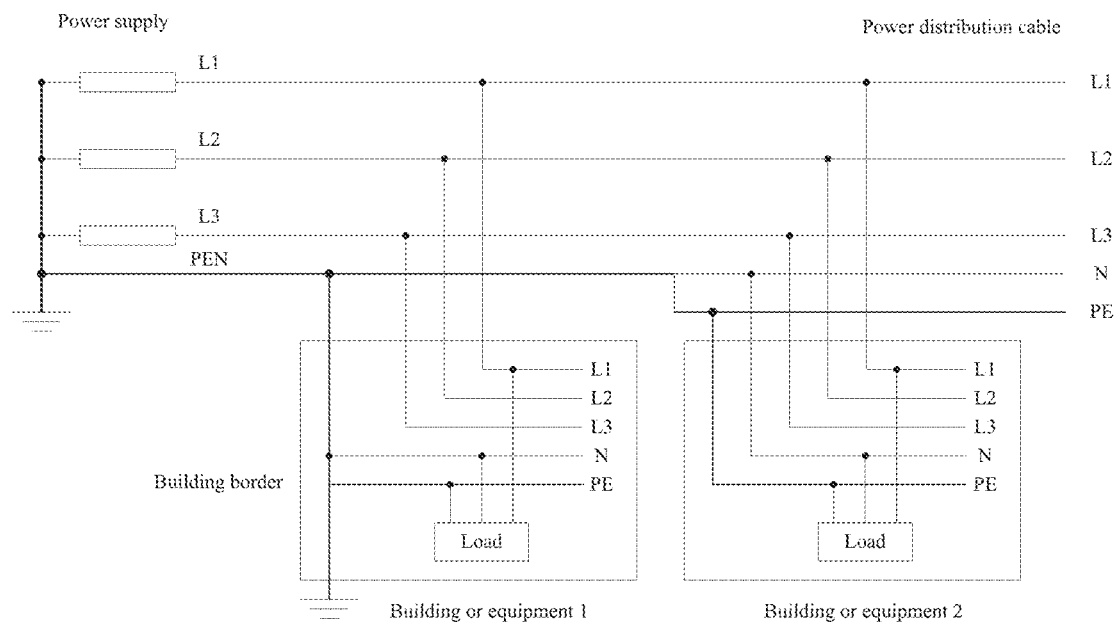
FIG. 5 is a schematic diagram showing a TN-C-S (Terra Neutral-Separate-Combined) power supply system in another technical solution in prior art.

Further, the power supply apparatus for supplying power in off-grid needs to meet the requirement of safe power supply, and the conventional power supply modes are as shown in FIGS. 4 and 5. FIG. 4 is a schematic diagram showing a TN-S (Terra Neutral-Separate) power supply system in a technical solution in prior art; and FIG. 5 is a schematic diagram showing a TN-C-S (Terra Neutral-Separate-Combined) power supply system in another technical solution in prior art.

Referring to FIG. 4, in the TN-S power supply system, the working neutral line N is separated from the dedicated protection line PE. When the power supply system is in normal operation, there is no current on the dedicated protection line PE, and the zero-connecting protection line of the load is connected to the dedicated protection line PE, making the power supply system safe and reliable.

Referring to FIG. 5, in the TN-C-S power supply system, in the part where the working neutral line N is connected to the dedicated protection line PE, that is, where the working neutral line N is grounded, the line PE, that is, the working zero line N needs to be grounded repeatedly, otherwise it is hard to supply power safely.

In the existing power supply systems, there are two connection manners at the load end of the power generation device, i.e., a working zero line N grounding or no grounding. When the existing power supply system is in grid-connected operation, it can exchange energy supply with the power grid through single-phase two-wire, so the working zero line N is not allowed to be secondly-grounded. And when the existing power supply system is in off-grid operation, it provides to the user with a single-phase three-wire voltage source output consistent with the power supply output of the original power distribution scheme with grid supplying power, therefore, the working neutral line N needs to be grounded locally.

Figure 6:
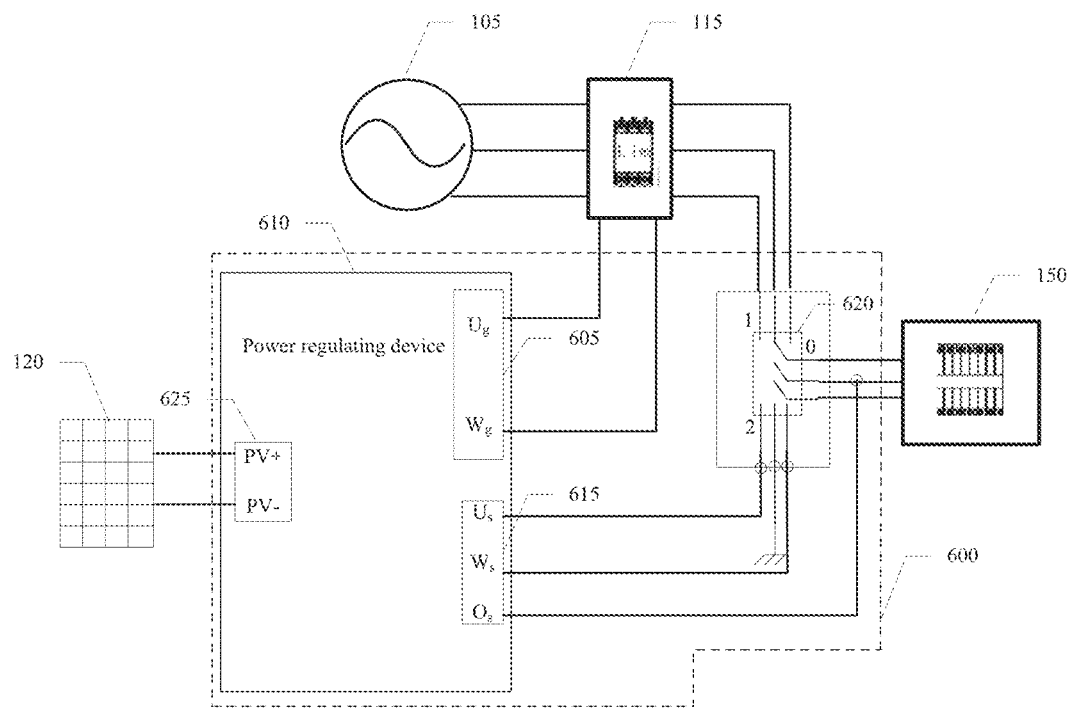
FIG. 6 is a schematic block diagram showing an apparatus of power distribution according to an exemplary embodiment of the present disclosure.

Based on the above, in an exemplary embodiment of the present disclosure, an apparatus of power distribution is provided at first. Referring to FIG. 6, the apparatus of power distribution 600 may include: a power regulating device 610 and a first auxiliary power distribution component 620.

The power regulating device 610 has a first output end 605 and a second output end 615, wherein the first output end 605 is electrically connected to the AC (Alternating Current) power grid 105. The first auxiliary power distribution component 620 has a first movable end 0, a first fixed end 1 and a second fixed end 2, the first movable end 0 is electrically connected to the load 150, the first fixed end 1 is electrically connected to the AC power grid 105, and the second fixed end 2 is electrically connected to the second output end 615, and the ground line of the second fixed end 2 is grounded. When the AC power grid 105 is normal (works normally), the first movable end 0 is connected to the first fixed end 1, such that the AC power grid 105 supplies power to the load 150. When the AC power grid 105 is abnormal (fails), the first movable end 0 is connected to the second fixed end 2, such that the power regulating device 610 supplies power to the load 150 via the second output end 615.

Further, in the present exemplary embodiment, the neutral line of the load 150 is electrically connected to the neutral line of the second output end 615 of the power regulating device 610. When the first movable end 0 of the first auxiliary power distribution component 620 is connected with the second fixed end 2, both the neutral line of the load 150 and the neutral line of the second output end 615 of the power regulating device 610 are electrically connected to the ground line of the second fixed end 2, and are grounded via the ground line of the second fixed end 2.

According to the apparatus of power distribution shown in FIG. 6, on the one hand, when the AC power grid is abnormal, the first movable end 0 of the first auxiliary power distribution component 620 is connected with the second fixed end 2, and the ground line of the second fixed end 2 is grounded, so that in off-grid operation, the three-phase alternating current power output by the power regulating device 610 is directly supplied to the load, and both the load and the three-phase alternating current power output by the power regulating device 610 can be grounded, so as to safely supply power to the load 150. On the other hand, the apparatus of power distribution in the exemplary embodiment can meet the requirement of the grid-connected operation and off-grid operation without changing the original power distribution structure owned by users, thereby saving manpower and material costs.

In addition, in the present exemplary embodiment, the power regulating device 610 can include a first input end 625, the first input end 625 is electrically connected to the power generation device 120, and the power regulating device 610 can be used to convert the electrical energy output from the power generation device 120. When the power grid 105 operates normally, the power regulating device 610 converts the electrical energy output by the power generation device 120 into suitable alternating current power (referred to as a first alternating current power in the present disclosure) and provides it to the power grid 105 through the first output end 605, to realize grid-connected power generation. When the power grid is abnormal (e.g., due to a power outage caused by a grid fault), the power regulating device 610 converts the electrical energy output by the power generation device 120 into suitable alternating current power (referred to as a second alternating current power in the present disclosure) and provides it to the load through the second output end 615, to realize off-grid power generation.

It should be noted that, in the present exemplary embodiment, the power generation device 120 is a photovoltaic power generation device, but the exemplary embodiments of the present disclosure are not limited thereto. For example, the power generation device may be a wind power generation device or a fuel cell power generation device, etc. as well, which is not specifically limited in the present disclosure. Similarly, the power regulating device 610 may further include a plurality of first input ends 625, each of the first input ends 625 is correspondingly connected to one power generation device 120, and the plurality of power generation devices 120 may be of different types.

Further, in the present exemplary embodiment, the first input end 625 is a DC input end. When the AC power grid 105 is normal, the power regulating device 610 converts the electrical energy generated by the power generation device 120 into the first alternating current power and outputs it to the AC power grid 105 through the first output end 605. The power generation device 120 operates in a grid-connected power generation mode. When the AC power grid 105 is abnormal, the power regulating device 610 converts the electrical energy generated by the power generation device 120 into the second alternating current power and supplies it to the load 150 through the second output end 615. The power generation device 120 operates in an off-grid power generation mode.

Figure 7:
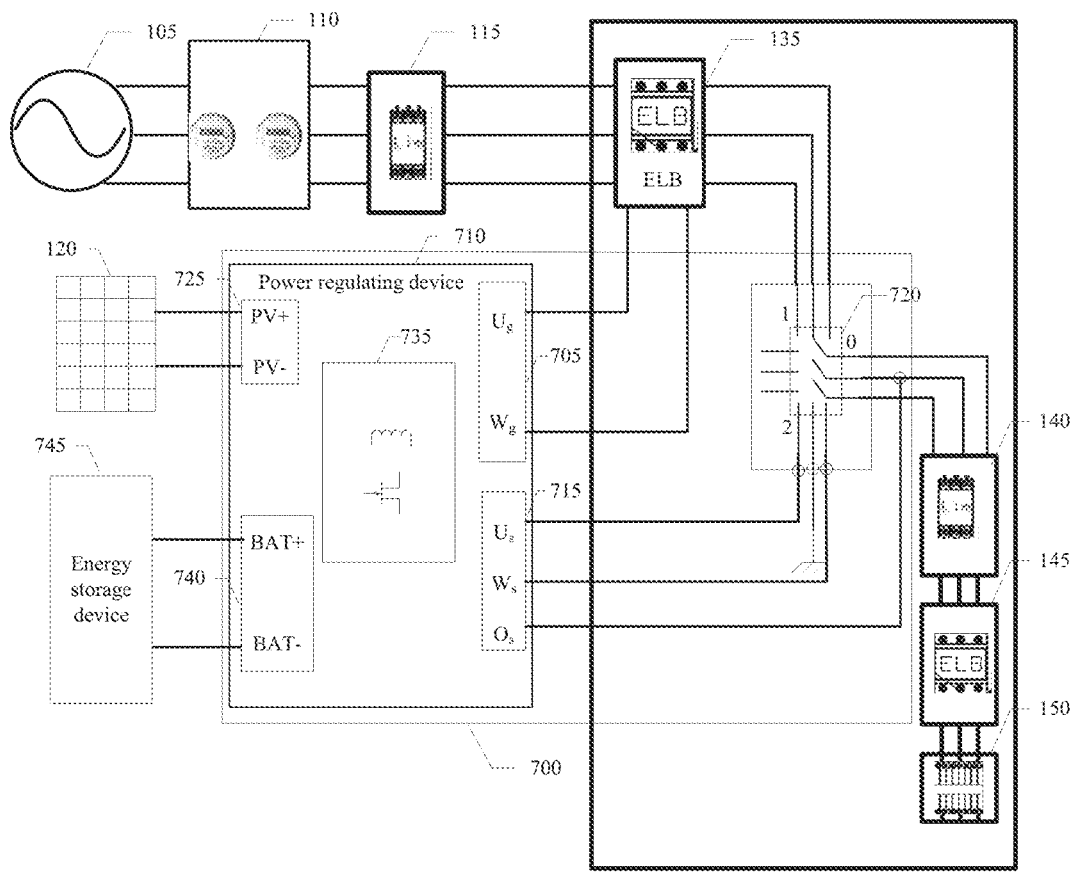
FIG. 7 is a schematic block diagram showing an apparatus of power distribution according to another exemplary embodiment of the present disclosure.

Most of the new energy power generation is intermittent power generation, and the power supply is unstable. Taking photovoltaic power generation as an example, the power grid cannot use photovoltaic power generation during peak hours, such as at night, but needs to absorb a large amount of photovoltaic power generation during low valley power supply, such as during the day time. It is necessary to absorb and store new energy power generation during the low valley power supply of the power grid, and the stored new energy power generation can be used to supply load during the peak hours. Therefore, the energy storage system has become a focus of solving the problem of instability of new energy generation. The introduction of energy storage system is helpful for the power grid to alleviate problem of matching in different times between the peak of new energy generation and the peak of power consumption. FIG. 7 is a schematic block diagram showing an apparatus of power distribution according to another exemplary embodiment of the present disclosure.

Referring to FIG. 7, the apparatus of power distribution 700 may include: a power regulating device 710 and a first auxiliary power distribution component 720. The power generation device 120 is connected to the apparatus of power distribution 700 at the DC side of the apparatus of power distribution 700.

In the present exemplary embodiment, the power regulating device 710 has a first output end 705 and a second output end 715, and a first input end 725 and a second input end 740, wherein the first output end 705 is electrically connected to the AC power grid 105, the first input end 725 is electrically connected to the power generation device 120, and the second input end 740 is electrically connected to an energy storage device 745.

The power regulating device 710 may further include: a power conversion circuit 735 for converting electrical energy of the power generation device 120 or of the energy storage device 745.

The first auxiliary power distribution component 720 has a first movable end 0, a first fixed end 1 and a second fixed end 2. The first movable end 0 is electrically connected to the load 150. The first fixed end 1 is electrically connected with the AC power grid 105. The second fixed end 2 is electrically connected to the second output end 715, and the ground line of the second fixed end 2 is grounded. When the AC power grid 105 is normal, the first movable end 0 is connected to the first fixed end 1, such that the AC power grid 105 supplies power to the load 150. And when the AC power grid 105 is abnormal, the first movable end 0 is connected to the second fixed end 2, such that the power regulating device 710 supplies power to the load 150 via the second output end 715.

Further, in the present exemplary embodiment, the neutral line of the load 150 is electrically connected to the neutral line of the second output end 715 of the power regulating device 710. When the first movable end 0 of the first auxiliary power distribution component 720 is connected with the second fixed end 2, both the neutral line of the load 150 and the neutral line of the second output end 715 of the power regulating device 710 are electrically connected to the ground line of the second fixed end 2, and are grounded via the ground line of the second fixed end terminal 2.

Further, when the AC power grid 105 is normal, the power regulating device 710 converts the electrical energy of the energy storage device 745 into the first alternating current power and transmits it to the AC power grid 105 through the first output end 705. And when the AC power grid 105 is abnormal, the power regulating device 710 converts the electrical energy of the energy storage device 745 into the second alternating current power, and supplies it to the load 150 via the second output end 715.

In the present embodiment, the power conversion circuit 735 can convert the electrical energy output by the energy storage device, and can convert the input electrical energy and store it into the energy storage device 745 as well. Due to the introduction of the energy storage device, a stable power supply can be provided to the load 150 when the AC power grid 105 fails, and the power generation device 120 can supply power to the load 150 or charge the energy storage device in off-grid operation. The power generation device 120 can store excess electrical energy (such as that during low valley power supply) in the energy storage device in grid-connected operation, so as to supply power to the load in the event of a grid fault or to provide power to the power grid during the peak hours of power usage.

Further, in the present exemplary embodiment, when the AC power grid 105 is abnormal, at least one of the power generation device 120 and the energy storage device 745 can supply power to the load 150 through the power conversion circuit 735 and the second output end 715.

It should be noted that, although the power regulating device 710 does not include the energy storage device 745 in FIG. 7, in other exemplary embodiments of the present disclosure, the power regulating device 710 may include the energy storage device 745, which is within the scope of this embodiment as well. Similarly, the power regulating device 710 can further include a plurality of second input ends 740, and each of the second input ends 740 is correspondingly connected to an energy storage device 745.

Figure 8:
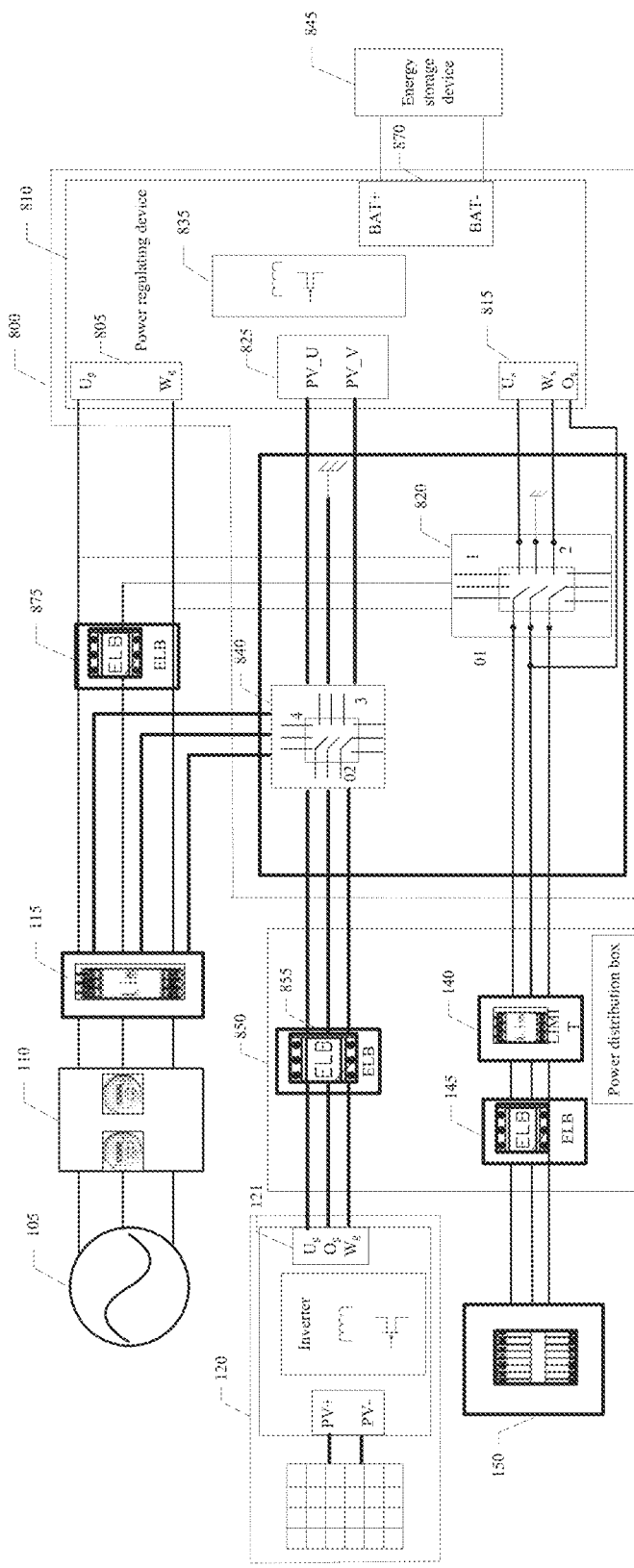
FIG. 8 is a schematic block diagram showing an apparatus of power distribution according to further another exemplary embodiment of the present disclosure.

FIG. 8 is a schematic block diagram showing an apparatus of power distribution according to further another exemplary embodiment of the present disclosure.

Referring to FIG. 8, an apparatus of power distribution 800 may include: a power regulating device 810, a first auxiliary power distribution component 820 and a second auxiliary power distribution component 840. The power generation device 120 is connected to the apparatus of power distribution device 800 at the AC side of the apparatus of power distribution device 800.

In the present exemplary embodiment, the power regulating device 810 has a first output end 805 and a second output end 815, and a first input end 825 and a second input end 870, wherein the first output end 805 is electrically connected to the AC power grid 105, the first input end 825 is electrically connected to the power generation device 120, and the second input end 870 is electrically connected to the energy storage device 845.

In the present exemplary embodiment, the first auxiliary power distribution component 820 has a first movable end 01, a first fixed end 1 and a second fixed end 2. The first movable end 01 is electrically connected to the load 150. The first fixed end 1 is electrically connected to the AC power grid 105. The second fixed end 2 is electrically connected to the second output end 815, and the ground line of the second fixed end 2 is grounded. When the AC power grid 105 is normal, the first movable end 01 is connected to the first fixed end 1, such that the AC power grid 105 supplies power to the load 150. And when the AC power grid 105 is abnormal, the first movable end 01 is connected to the second fixed end 2, such that the power regulating device 810 supplies power to the load 150 via the second output end 815.

In addition, in the present exemplary embodiment, the second auxiliary power distribution component 840 has a second movable end 02, a third fixed end 3 and a fourth fixed end 4. The second movable end 02 is electrically connected to the power generation device 120. The third fixed end 3 is electrically connected to the first input end 825. The fourth fixed end 4 is electrically connected to the AC power grid 105, and the ground line of the third fixed end 3 is grounded.

Further, in the present exemplary embodiment, the first input end 825 is an AC input end. When the AC power grid 105 is normal, the second movable end 02 is connected to the fourth fixed end 4, and the power generation device 120 outputs electrical energy to the AC power grid 105 via the second auxiliary power distribution component 840. The power generation device 120 operates in the grid-connected power generation mode. When the AC power grid 105 is abnormal, the second movable end 02 is connected to the third fixed end 3, and the power generation device 120 outputs electrical energy to the first input 825 via the second auxiliary power distribution component 840. The power generation device 120 operates in the off-grid power generation mode.

Moreover, in the present exemplary embodiment, the power regulating device 810 may further include: a power conversion circuit 835 for converting electrical energy of the power generation device 820 or of the energy storage device 845. When the AC power grid 105 is abnormal, the power generation device 120 and/or the energy storage device 845 supply power to the load 150 through the power conversion circuit 835 and the second output end 815. For example, when the AC power grid 105 is abnormal, the AC power output by the power generation device 120 is transmitted to the first input end 825 of the power conversion device 810 via the second auxiliary component 840, wherein the second movable end 02 is connected to the third fixed end 3, such that the neutral line of the output end 121 of the power generation device 120 is connected to the ground line of the third fixed end 3. As a result, the output end 121 of the power generation device 120 is grounded through the third fixed end 3. The power conversion circuit 835 converts the electrical energy provided by the power generation device 120 into suitable alternating current power (referred to as the second alternating current power in the present disclosure) and provides it to the load 150 via the first auxiliary power distribution component 820 and the second output 815. When the power generation device 120 is at the peak of power generation, the excess power can be converted by the power conversion circuit 835, to charge the energy storage device 845 through the second input end 870. When the power generation device 120 is in the valley of power generation, the insufficient power can be supplied by the energy device 845, that is, both the energy storage device 845 and the power generation device 120 collectively supply power to the load 150. The first movable end 01 is connected to the second fixed end 2, the neutral line of the load 150 is electrically connected to the neutral line of the second output end 815, and both the neutral line of the load 150 and the neutral line of the second output end 815 are connected to the ground line of the second fixed end 2 to achieve earthing, which satisfies safety requirement.

When the AC power grid 105 is normal, the power generation device 120 outputs electrical energy to the AC power grid 105. The power generation device 120 operates in the grid-connected mode. When it is in the peak of power usage, the energy storage device 845 can output electrical energy to the AC power grid 105 through the power conversion circuit 835 and the first output end 805. When it in the valley of power usage, the AC power grid 105 can charge the energy storage device 845 through the first output 805 and the power conversion circuit 835.

It should be noted that, in the exemplary embodiment of the present disclosure, the first auxiliary power distribution component and the second auxiliary power distribution component may be three-pole switches, and may be other suitable components as well, which are not specifically limited in the present disclosure. The auxiliary power distribution component can be manually switched or intelligently switched. In a manual switching mode, when the main control system of the power regulating device detects the power grid fault, it will notify the user in an easy-to-access manner, such as issuing an alarm, or displaying the fault information on a visual interface of the product, or sending the fault information to an application software (such as a mobile phone APP). After the user obtains the fault information, the user manually switches the auxiliary power distribution component, so as to supply power to the load by using the power generation device and/or the energy storage device. In the intelligent switching mode, each auxiliary power distribution component may be integrated with a controller, and when the main control system of the power regulating device detects the power grid fault, it communicates with the controller of the auxiliary power distribution component and transmits the fault information to the controller. The controller controls the auxiliary power distribution component to be switched, so as to supply power to the load by using the power generation device and/or the energy storage device.

Further, the apparatus of power distribution in the exemplary embodiment of the present disclosure may be applied to household power distribution. When applied to household power distribution, the first auxiliary power distribution component and/or the second auxiliary power distribution component may be disposed to precede the main switch of the household load.

Further, in an exemplary embodiment of the present disclosure, a method of power distribution is provided, which can be applied to the apparatus of power distribution shown in FIGS. 6 and 7 described above. The method of power distribution may include: when the AC power grid is normal, the first movable end of the first auxiliary power distribution component is connected to the first fixed end, so that the AC power grid supplies power to the load. And when the AC power grid is abnormal, the first movable end of the first auxiliary power distribution component is connected to the second fixed end, so that the power regulating device supplies power to the load via the second output end.

Further, in the exemplary embodiment of the present disclosure, another method of power distribution is provided, which can be applied to the apparatus of power distribution shown in FIG. 8 described above. The method of power distribution may include: when the AC power grid is normal, the first movable end of the first auxiliary power distribution component is connected to the first fixed end, so that the AC power grid supplies power to the load, and the second movable end of the second auxiliary power distribution component is connected to the fourth fixed end, such that the power generation device outputs electrical energy to the AC power grid. And when the AC power grid is abnormal, the first movable end of the first auxiliary power distribution component is connected to the second fixed end, so that the power regulating device supplies power to the load via the second output end, and the second movable end of the second auxiliary power distribution component is connected to the third fixed end, such that the power generation device outputs electrical energy to the power regulating device.

In the present disclosure, according to actual needs, the plug-in manner of new energy and the power supply mode of the load are flexibly switched. When the system detects that the power grid is normal, the apparatus of power distribution may be automatically or manually switched to the grid-connected operation mode, and the power grid and the power generation device directly supply power to the load collectively. The neutral line of the power supplied to the load is the neutral line of the power grid, and the load side may not be secondly grounded. When the system detects a power grid fault, the apparatus of power distribution may be automatically or manually switched to the off-grid operation mode, and the power regulating device uses the electrical energy of the power generation device and/or of the energy storage device to supply power to the load. At the same time, both the neutral line of the load and the neutral line of the power supply device meet the requirement of grounding.

The apparatus of power distribution of the disclosure not only can realize safe power supply, but also can realize a plurality of power distribution manners without changing the original power distribution lines. For example, the power distribution manner, which can be realized when the power grid is normal, includes: the power grid supplies power to the load, both the power grid and the new energy simultaneously supply power to the load, or the power grid, the new energy and the energy storage device jointly supply power to the load. And the power distribution manner, which can be realized when the power grid is abnormal, includes: new energy supplies power to the load, and new energy and energy storage device collectively supply power to the load. Switching can be performed flexibly among the above various power distribution manners only by changing the connection manner of the ends of the auxiliary power distribution components, which is very convenient.

Auxiliary power distribution components are added in the apparatus of power distribution of the present disclosure. In off-grid operation, the neutral line is grounded at the location of the load through the auxiliary power distribution component, and the power generation mode in grid-connected operation is simulated. It does not need to separately develop products for different users, and safe power supply and different working modes can be realized only by adjusting the power distribution manners and the connection between the power generation device and the power grid. The auxiliary power distribution components are disposed to precede the main switch of the load, so that the auxiliary power distribution component can be easily added in or removed from the power distribution lines without affecting the original power distribution lines. The apparatus of power distribution and the method of power distribution of the disclosure do not need to reconstruct the existing power distribution of users, and can meet the requirement of users with different demand and safe power supply.

After those skilled in the art consider the specification of the disclosure and practice it, they will easily think of other embodiments of the present disclosure. The present application intends to cover any variations, uses or adaptations of the present disclosure, which are in accordance with the general principles of the present disclosure and include common sense or conventional technical means in the art that are not described in the present disclosure. The specification and embodiments are to be regarded as illustrative only, so the real scope and spirit of the present disclosure are defined by the appended claims.

It is to be understood that the disclosure is not limited to the details that have been described above and shown in the accompanying drawings, and can be modified and changed variously without going beyond the scope thereof. The scope of the disclosure is limited only by the appended claims.

What is claimed is:

1. An apparatus of power distribution, comprising:
   a power regulating device, having a first output end and a second output end, wherein the first output end is electrically connected to an AC power grid, and the second output end is a single-phase three-wire voltage source output end; and
   a first auxiliary power distribution component, having a first movable end, a first fixed end and a second fixed end, wherein the first movable end is electrically connected to a load, the first fixed end is electrically connected to the AC power grid, the second fixed end is electrically connected to the second output end, the second fixed end has three connection terminals, and one of the three connection terminals is a ground line that is grounded,
   wherein, when the AC power grid is normal, the first movable end is connected to the first fixed end, such that the AC power grid supplies power to the load; and when the AC power grid is abnormal, the first movable end is connected to the second fixed end, such that the power regulating device supplies power to the load through the second output end, and
   a neutral line of the load is electrically and fixedly connected to a neutral line of the second output end, the neutral line of the load and the neutral line of the second output end themselves are not grounded, and when the first movable end is connected to the second fixed end, the neutral line of the load and the neutral line of the second output end are electrically connected to the ground line of the second fixed end, and grounded through the ground line of the second fixed end.

2. The apparatus of power distribution of claim 1, wherein the power regulating device has a first input end, the first input end is electrically connected to a power generation device, and the power regulating device converts electrical energy of the power generation device.

3. The apparatus of power distribution according to claim 2, wherein the power regulating device further has a second input end, the second input end is electrically connected to an energy storage device, and the power regulating device converts the electrical energy charging the energy storage device or the electrical energy discharged from the energy storage device.

4. The apparatus of power distribution according to claim 2, wherein the first input end is a DC input end, and when the AC power grid is normal, the power regulating device converts the electrical energy of the power generation device into a first alternating current and transmits it to the AC power grid through the first output end, and the power generation device operates in a grid-connected power generation mode; and when the AC power grid is abnormal, the power regulating device converts the electrical energy of the power generation device into a second alternating current and supplies power to the load through the second output end, and the power generation device operates in an off-grid power generation mode.

5. The apparatus of power distribution according to claim 3, wherein, when the AC power grid is normal, the power regulating device converts the electrical energy of the energy storage device into a first alternating current and transmits it to the AC power grid through the first output end; and when the AC power grid is abnormal, the power regulating device converts the electrical energy of the energy storage device into a second alternating current and supplies power to the load through the second output end.

6. The apparatus of power distribution according to claim 2, wherein the apparatus of power distribution further comprises a second auxiliary power distribution component, wherein the second auxiliary power distribution component has a second movable end, a third fixed end and a fourth fixed end, the second movable end is electrically connected to the power generation device, the third fixed end is electrically connected to the first input end, the fourth fixed end is electrically connected to the AC power grid, and a ground line of the third fixed end is grounded.

7. The apparatus of power distribution according to claim 6, wherein the first input end is an AC input end, and when the AC power grid is normal, the second movable end is connected to the fourth fixed end, and the power generation device outputs the electrical energy to the AC power grid through the second auxiliary power distribution component, and the power generation device operates in a grid-connected power generation mode; and when the AC power grid is abnormal, the second movable end is connected to the third fixed end, the power generation device outputs the electrical energy to the first input end through the second auxiliary power distribution component, and the power generation device operates in an off-grid power generation mode.

8. The apparatus of power distribution according to claim 6, wherein, when the AC power grid is abnormal, a neutral line of an output end of the power generation device is connected to the ground line of the third fixed end, so as to be grounded through the third fixed end.

9. The apparatus of power distribution of claim 1, wherein the apparatus of power distribution is applied to household power distribution, and the first auxiliary power distribution component is disposed to precede a main switch of a household load.

10. A method of power distribution, applied on an apparatus of power distribution, wherein the apparatus of power distribution comprise:
    a power regulating device, having a first output end and a second output end, wherein the first output end is electrically connected to an AC power grid, and the second output end is a single-phase three-wire voltage source output end; and
    a first auxiliary power distribution component, having a first movable end, a first fixed end and a second fixed end, wherein the first movable end is electrically connected to a load, the first fixed end is electrically connected to the AC power grid, the second fixed end is electrically connected to the second output end, the second fixed end has three connection terminals, and one of the three connection terminals is a ground line that is grounded,
    wherein a neutral line of the load is electrically and fixedly connected to a neutral line of the second output end, the neutral line of the load and the neutral line of the second output end themselves are not grounded, and
    the method of power distribution comprises:
    when the AC power grid is normal, the first movable end of the first auxiliary power distribution component is connected to the first fixed end, so that the AC power grid supplies power to the load; and when the AC power grid is abnormal, the first movable end of the first auxiliary power distribution component is connected to the second fixed end, so that the power regulating device supplies power to the load through the second output end, wherein when the first movable end is connected to the second fixed end, the neutral line of the load and the neutral line of the second output end are electrically connected to the ground line of the second fixed end, and grounded through the ground line of the second fixed end.

11. A method of power distribution, applied on an apparatus of power distribution, wherein the apparatus of power distribution comprises:

a power regulating device, having a first output end, a second output end and a first input end, wherein the first output end is electrically connected to an AC power grid and the first input end is electrically connected to a power generation device, and the power regulating device converts electrical energy of the power generation device;

a first auxiliary power distribution component, having a first movable end, a first fixed end and a second fixed end, wherein the first movable end is electrically connected to a load, the first fixed end is electrically connected to the AC power grid, the second fixed end is electrically connected to the second output end, and a ground line of the second fixed end is grounded; and a second auxiliary power distribution component, having a second movable end, a third fixed end and a fourth fixed end, wherein the second movable end is electrically connected to the power generation device, the third fixed end is electrically connected to the first input end, the fourth fixed end is electrically connected to the AC power grid, and a ground line of the third fixed end is grounded; and the method of power distribution comprises:

when the AC power grid is normal, the first movable end of the first auxiliary power distribution component is connected to the first fixed end, such that the AC power grid supplies power to the load, and the second movable end of the second auxiliary power distribution component is connected to the fourth fixed end, such that the power generation device outputs the electrical energy to the AC power grid; and when the AC power grid is abnormal, the first movable end of the first auxiliary power distribution component is connected to the second fixed end, so that the power regulating device supplies power to the load through the second output end, and the second movable end of the second auxiliary power distribution component is connected to the third fixed end, such that the power generation device outputs the electrical energy to the power regulating device.

* * * * *